United States Patent [19]

Osuna-Diaz

[11] Patent Number: 5,645,874
[45] Date of Patent: Jul. 8, 1997

[54] MULTIPLE GATE INJECTION NOZZLE

[76] Inventor: Jesus' M. Osuna-Diaz, 908 Ravine Terrace Ct., Rochester Hills, Mich. 48307

[21] Appl. No.: 937,140
[22] Filed: Aug. 31, 1992
[51] Int. Cl.⁶ .................................................. B29C 45/22
[52] U.S. Cl. .......................... 425/549; 425/570; 425/572
[58] Field of Search ................................. 425/547, 548, 425/549, 552, 570, 572, 568

[56] References Cited

U.S. PATENT DOCUMENTS 4,033,485  7/1977  Kohler ........................................ 425/548
4,902,219  2/1990  Leverenz .................................... 425/549
5,217,730  6/1993  Teng ............................................ 425/572

Primary Examiner—Tim Heitbrink
Attorney, Agent, or Firm—John R. Benefiel

[57] ABSTRACT

A multiple gate injection nozzle is described in which individual insert heaters are utilized, each associated with a respective probe to allow different probe lengths without upsetting proper temperature conditions at each gate. A main heater is also used encircling the main body of the nozzle. Replaceable copper sealing rings expand to a greater extent than the steel main body to increase the sealing pressure during operation.

2 Claims, 2 Drawing Sheets

MULTIPLE GATE INJECTION NOZZLE

BACKGROUND OF THE INVENTION

This invention concerns injection molding nozzles used to inject molten plastic into the cavity of a mold. Such nozzles receive molten plastic from an injection machine and direct the same into a mold cavity through a gate which is configured to control the flow and condition of the plastic to create proper separation at the gate while insuring continued flow during injection. Injection nozzles may be employed in single cavity molds or a series of nozzles used with multiple cavity molds with runners in a manifold connecting the injection machine with each nozzle.

Injection nozzles often utilize electrical heaters encircling a nozzle body to keep the plastic at the correct temperature. In some instances, heated "torpedoes" are placed within the nozzle for this same purpose.

There has heretofore been developed multiple gate nozzles, in which a single nozzle is equipped with a circumferential array of gates which mate with a corresponding array of mold cavities.

In this arrangement, the nozzle body is equipped with an encircling heater which heats all of the gates by conducting heat through the nozzle body to probes mounted in the nozzle body to extend within a respective gate opening.

While simple, this arrangement has the disadvantage that the gates must be located at a particular radius in order that the proper temperature of the melt is maintained. Similarly, the length of the probe disposed within each gate must be the same so that the heat transferred from the heater through the body is approximately the same. This is a disadvantage as sometimes different probe "reaches" are necessitated by different gate locations, as for a single mold cavity having a plurality of varying gate locations distributed along a spiral or other changing shape. The prior heater arrangement has limited application in these instances.

Water cooling lines are often employed in the mold to increase cycle times by speeding solidification after each injection, but the transfer of heat from the encircling heater is such that solidification of the melt in the gates can occur if the lines are too close. Again, the above described multiple gate nozzle configuration severely limits the placement of cooling lines.

Since the heater must heat the entire nozzle body and transfer heat into the probes, warmup times required tend to be excessive in this design.

Certain plastic temperature ranges have to be maintained at the gate, which is also difficult to achieve with the prior art multiple gate nozzles.

Another problem has been encountered with the prior multiple gate nozzles concerning sealing of the nozzle against the mold plate. A seal must be provided isolating each gate to prevent the escape of plastic from each gate into the space between the nozzle body and the mold plate. The usual practice has been to simply machine lands around each gate on the nozzle body, which are pressed against the mold plate by the pressure exerted by the injection machine to achieve sealing.

There is no preloading of the seal to insure sufficient sealing pressure, leading to instances of leakage of melt during injection.

Also, if the sealing lands are damaged, the entire nozzle body must be replaced or repaired.

Accordingly, an object of the present invention is to provide an improved heater arrangement for a multiple gate nozzle in which much better control over heating at each gate is achieved to allow considerable design latitude in gate and tip location for each individual gate, enabling wider application of the concept, closer location of cooling lines, and reduced start up times.

Another object of the invention is to provide an improved sealing arrangement for the individual gates of a multiple gate nozzle.

SUMMARY OF THE INVENTION

The present invention comprises a multiple gate nozzle in which each probe associated with a respective gate is equipped with an individual heater to allow independently controlled rapid heating at each gate. In addition, a common nozzle body encircling heater is employed to heat the nozzle body. This arrangement has been found to allow a wide variation in the radial location and length of the probe while still maintaining proper temperature conditions of the melt at each gate.

Furthermore, rapid warm up is enabled, and the use of closely located cooling lines is made possible for shortened cycle times.

To seal each gate, a copper ring is positioned in a recess surrounding each gate which rings are all compressed by the injection machine. The copper rings have a greater coefficient of thermal expansion than steel, and thus expand as they are heated during injection to a greater extent than the steel of the nozzle main body and mold plates so that an additional sealing pressure is generated, increasing the reliability of the sealing action.

Furthermore, the seals are replaceable in the event of damage avoiding the need for repair or replacement of the entire nozzle body.

DETAILED DESCRIPTION

In the following detailed description, certain specific terminology will be employed for the sake of clarity and a particular embodiment described but it is to be understood that the same is not intended to be limiting and should not be so construed inasmuch as the invention is capable of taking many forms and variations within the scope of the appended claims.

Figure 1:
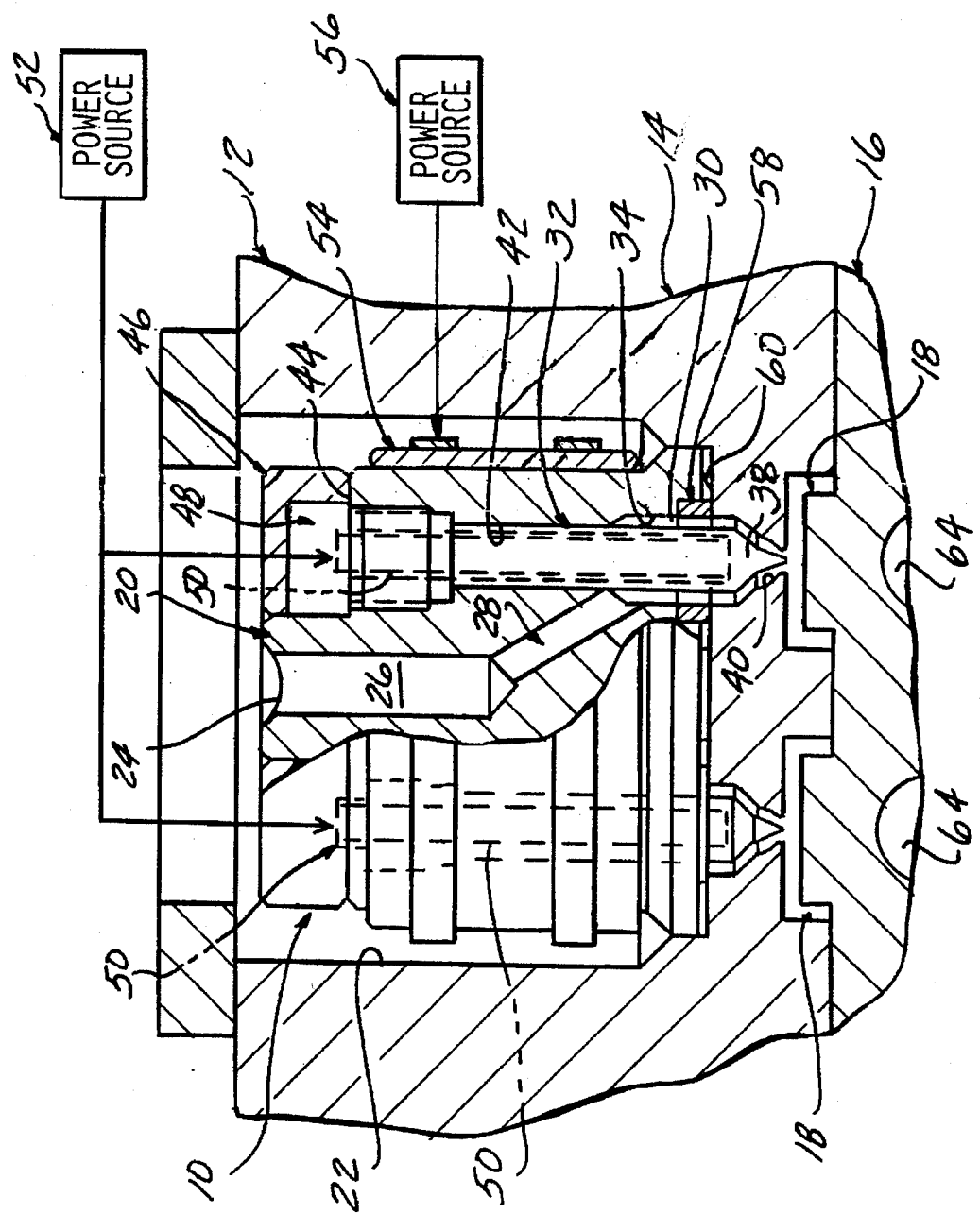
FIG. 1 is a fragmentary sectional view of a set of mold plates having installed therein a multiple gate nozzle according to the invention, shown in partial section.
Figure 2:
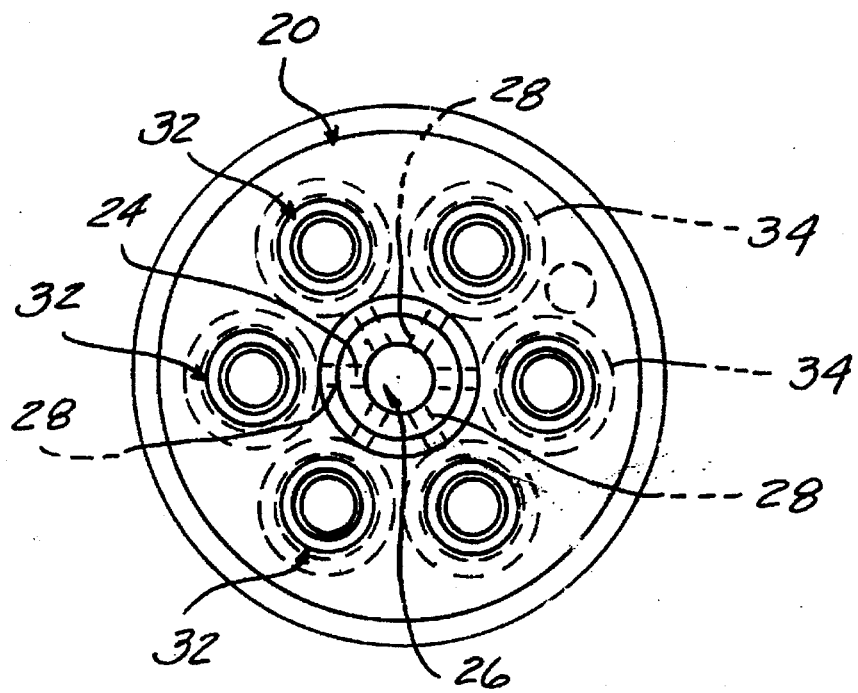
FIG. 2 is an end view of the nozzle shown in FIG. 1.

Referring to the Drawings, FIG. 1 shows a multiple gate nozzle 10 according to the present invention, installed in a mold 12 comprised of an upper plate 14 and lower plate 16 defining a plurality of mold cavities 18.

The multiple gate nozzle 10 comprises a main nozzle body 20 received in a bore 22 in the upper mold plate 14. A central seal pocket 24 adapted to mate with an injection machine (not shown) communicates with a central flow passage 26 which in turn feeds a plurality of radially extending branch passages 28.

Each branch passage 28 enters into a respective one of annular spaces 30 defined between each of a circumferential array of bores 34 in the lower end of the main nozzle body 20.

Each probe 32 has a conical tip 38 projecting into a convergent gate opening 40 formed above each mold cavity 18.

Each probe 32 is installed into a respective bore 42 extending axially to a shoulder 44 on the main nozzle body 20 with a retainer ring 46 installed thereon formed with recesses 48, each accommodating the end of a respective probe 32.

Each probe 32 is hollow to receive an elongated insert electrical heater 50 extending for substantially the full length. Preferably, each heater 50 has more closely spaced wiring turns at either end than at the middle so that the greater conduction of heat of the heater at the ends thereof is offset. This provides a substantially uniform temperature along the length of the insert heaters 50. This prevents localized overheating when higher wattages are developed by control over the voltage applied thereto by a power source 52. Heaters 50 of 800–1250 watts have been employed successfully.

Each heater 50 has a built-in thermocouple to allow automatic control over the temperature conditions at the gates 40, either collectively or individually.

In addition, a main heater 54 encircles the main nozzle body 20, connected to a power supply 56 so as to enable additional heating of the main nozzle body 20, aiding the heating of the individual insert heaters 50.

In order to provide effective sealing around each annular space 30, a copper or copper alloy sealing ring 58 is mounted into a counterbore machined into the end face of the main nozzle body 20 so as to protrude therefrom and engage the end wall 60 of the bore 22.

During molding, the main nozzle body 20 is held against the endwall 60 so as to fixedly position the copper sealing rings 58.

The heating caused by the flow of hot melt and the insert heaters 50, as well as the main heater 54 causes a differential rate of expansion of the sealing rings 58, since the main nozzle body 20 is constructed of steel. The sealing rings 50 thus expand to a greater extent. This in turn generates a enhanced sealing pressure which insures that no plastic will leak into the space between the end of the main nozzle body 20 and the endwall 60 of the bore 20.

Figure 3:
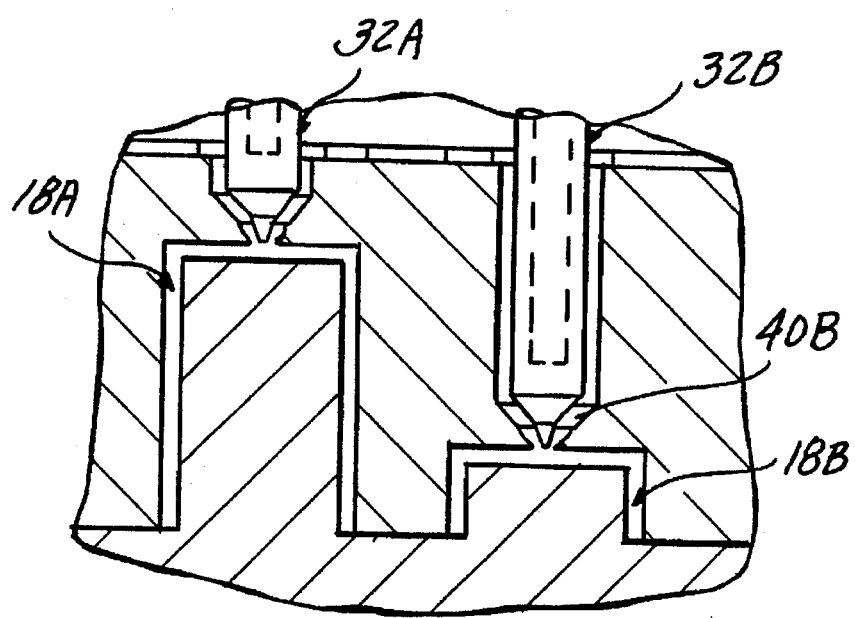
FIG. 3 is an enlarged fragmentary view of two different length nozzle probes incorporated in a multiple gate nozzle, with associated mold cavities.

The use of individual insert heaters allows greater flexibility of application as probes of varying reach can be employed as illustrated in FIG. 3, in which cavities 18A and 18B can be reached with probes 32A, 32B of different lengths without upsetting the temperatures conditions at the more remote gate 40B.

The radial location of the probes 32 can be varied as needed, and more closely controlled temperatures conditions at the gates 40 is also enabled.

A more rapid warm up is also made possible. Finally, closely positioned cooling lines 64 (FIG. 1) can be employed to shorten cycle times.

I claim:

1. A multiple gate injection nozzle comprising:

a generally cylindrical main body;

a central flow passage extending axially into said main body formed with a seal pocket at one end of said main body adapted to mate with an injection machine;

a circular array of gates extending out of said main body at an other end opposite said one end;

a circumferential array of elongated probes each disposed in a corresponding axial bore in said main body, each probe having a tip at one end disposed in a respective gate;

an annular space surrounding each probe and extending into said gate;

a radial cross passage extending from each annular space to said central flow passage;

a copper sealing ring encircling each annular space and having a side protruding from said other end of said main body to enable contact with a mold plate an elongated insert heater disposed within each probe enabling direct heating of each of said probes.

2. The injection nozzle according to claim 1 wherein said main body is constructed of steel whereby a differential expansion of said steel main body and said copper sealing rings during heating causes increased sealing pressure on said mold plate.

* * * * *

UNITED STATES PATENT AND TRADEMARK OFFICE
CERTIFICATE OF CORRECTION

PATENT NO. : 5,645,874
DATED : July 8, 1997
INVENTOR(S) : Jesus M. Osuna-Diaz

It is certified that error appears in the above-indentified patent and that said Letters Patent is hereby corrected as shown below:

Column 3, line 40, "generates a" should be --generates an--.

Column 4, line 5, "temperatures" should be --temperature--.

Column 4, line 9, "temperatures" should be --temperature--.

Column 4, line 10, "is" should be --are--.

Column 4, line 22, "an other" should be --another--.

Column 4, line 34, "plate" should be --plate;--.

Signed and Sealed this

Fourteenth Day of October, 1997

BRUCE LEHMAN

*Attest:*

*Attesting Officer*

*Commissioner of Patents and Trademarks*